Feb. 27, 1945.  W. F. PECK  2,370,257
BINOCULAR OR THE LIKE
Filed Oct. 3, 1941  2 Sheets-Sheet 1
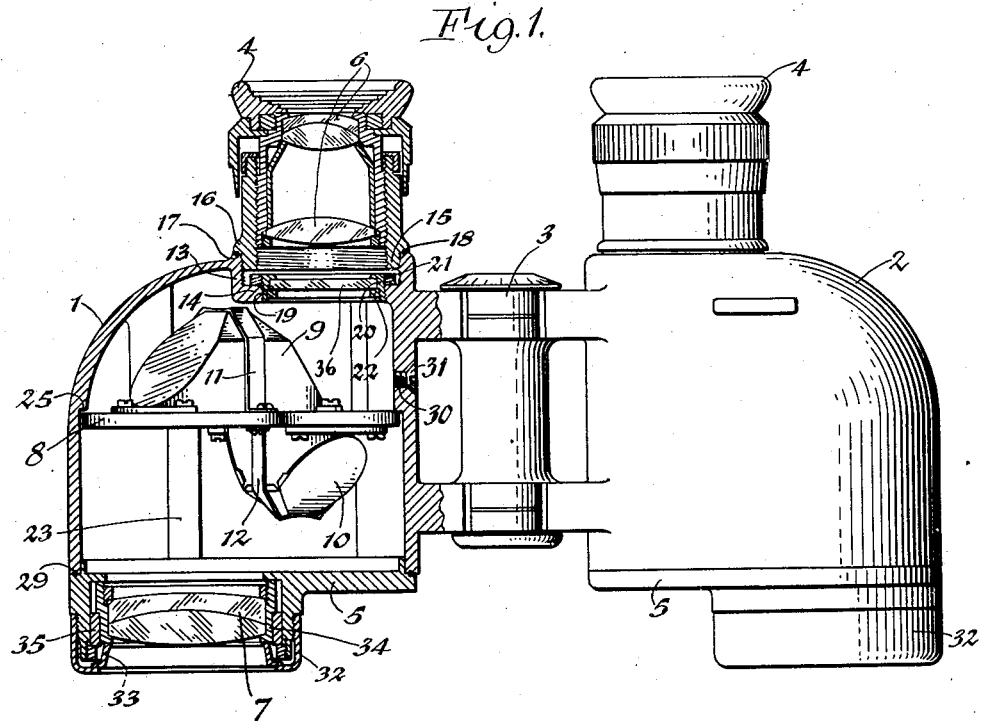
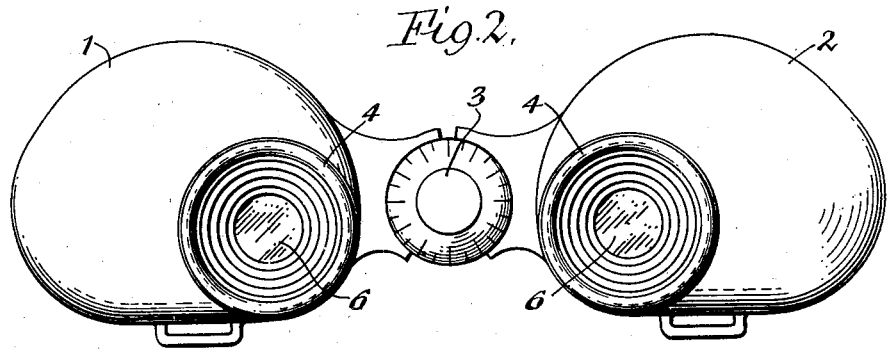
INVENTOR
WILLIAM F. PECK
BY
ATTORNEY Feb. 27, 1945.     W. F. PECK     2,370,257
BINOCULAR OR THE LIKE
Filed Oct. 3, 1941     2 Sheets-Sheet 2

INVENTOR
WILLIAM F. PECK
BY
Raymond A. Paquin
ATTORNEY

Patented Feb. 27, 1945

2,370,257

UNITED STATES PATENT OFFICE 2,370,257

BINOCULAR OR THE LIKE

William F. Peck, Snyder, N. Y., assignor to Spencer Lens Company, Buffalo, N. Y., a corporation of New York Application October 3, 1941, Serial No. 413,403

13 Claims. (Cl. 88—34)

This invention relates to improvements in binoculars and has particular reference to a new and improved type of binocular that possesses greater precision and which retains this precision and which is simpler and more economical to manufacture.

One of the objects of the invention is to provide a binocular having greater precision and which is so constructed as to permanently retain this precision and to stand wear and abuse without destruction.

Another object of the invention is to provide a binocular which is simpler and more economical to manufacture.

Another object of the invention is to provide a device of the type set forth that is so constructed that it may easily be taken apart for cleaning of the lenses or repairs and which may be easily and quickly reassembled.

Other objects and advantages of the invention will be apparent from the following description taken in connection with the accompanying drawings. It will be understood that many changes may be made in the details of construction and arrangements of parts without departing from the spirit of the invention as expressed in the accompanying claims. I therefore do not wish to be limited to the exact details of construction and arrangement of parts shown and described as the preferred form has been shown by way of illustration only.

Referring to the drawings:

Fig. 1 is a plan view partially in section of a binocular embodying the invention;

Fig. 2 is an end view from the eyepiece end;

Figure 3:
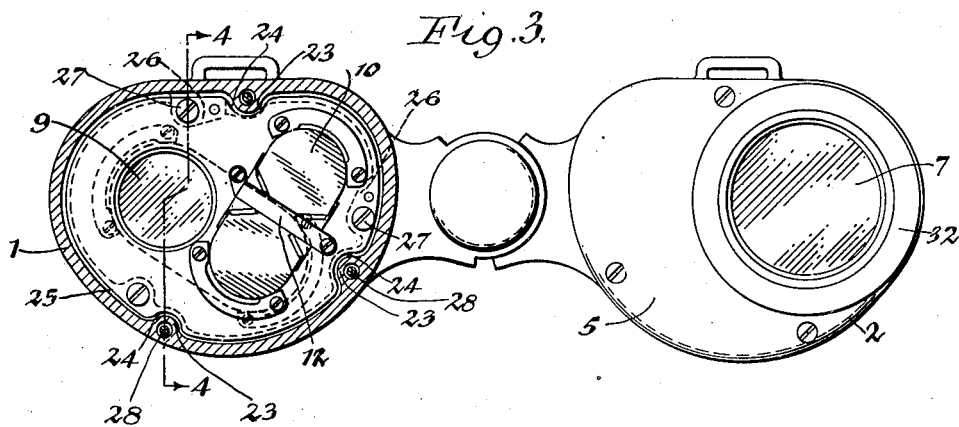
Fig. 3 is an end view partially in section from the objective end and showing the prism plate arrangement.
Figure 4:
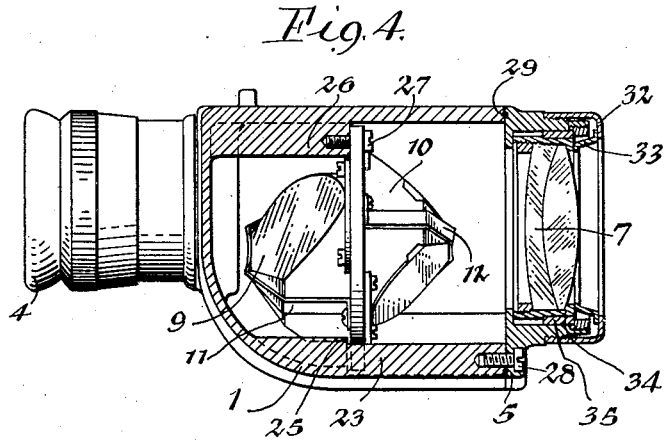
Fig. 4 is a sectional view taken on line 4—4 of Fig. 3 and looking in the direction of the arrows.
Figure 5:
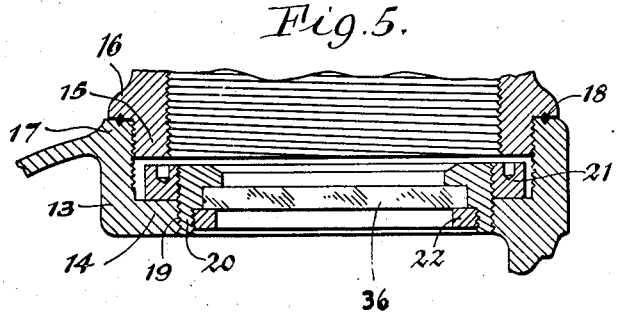
Fig. 5 is a fragmentary enlarged view showing the connection of one of the eyepieces to the casing.

In the construction of binoculars it is important that the binocular have the necessary precision and be constructed that it will permanently retain the precision which has been built into the device and also it must be able to stand considerable wear and abuse without breaking down. It is also important that such a device be so constructed that it may be easily disassembled for necessary cleaning or repair and then reassembled in the field.

The present construction is capable of meeting all of these requirements and in addition is a simple, efficient and economical construction to manufacture and one that allows tooling adapted for high precision work for large scale production.

Referring more particularly to the drawings wherein similar reference characters designate corresponding parts throughout the several views, the device shown embodying the invention comprises a pair of casings 1 and 2 pivotally connected by the hinge member 3.

Each of the casings 1 and 2 has secured thereto at one end thereof an eyepiece 4 and at the opposite end an objective mount 5. Each of the eyepieces 4 contains the lenses 6 and each of the objective mounts 5 contains the objective lens 7.

In each of the casings 1 and 2 is a prism plate or support 8 on which is secured the prisms 9 and 10 by means of the straps 11 and 12.

The said casings 1 and 2 are preferably formed by die casting and each have formed integral therewith a threaded circular portion 13 and integral inturned flange 14.

The threaded circular portion 13 is adapted to receive the threaded end 15 of the eyepiece 4 to support the eyepieces 4 on the casings 1 and 2. The eyepiece 4 has the flange portion 16 adjacent said threaded end 15 and adapted to engage the upper surface 17 on the casing 1 or 2 surrounding the threaded circular portion 13 and said flanges 16 and 17 each have a circular groove therein adapted to contain the sealing wax or the like 18 to assist in hermetically sealing the parts together when the parts are secured together.

The inturned flange 14 has the threaded portion 19 and the reticule holding ring 20 has a threaded outer portion adapted to threadedly engage said threaded portion 19 on the flange 14 and the ring 21 is provided having a threaded bore adapted to threadedly engage the upper threaded portion of the reticule retaining ring 20 to retain said reticule retaining ring 20 and reticule 36 in adjusted position. The ring 20 and reticule or milled scale 36 is placed in position on the flange on said retaining ring 20 and then adjusted by screwing said ring 20 up or down until the reticule is in the focal plane of the eyepiece and then the retaining ring 21 is tightened to retain the reticule in said adjusted position.

The threaded ring 22 engaging the threaded bore on the ring 20 is provided to allow the insertion or removal of the reticule or scale 36 in the said ring 20.

The objective mounts 5 are adapted to extend over the entire open end of the casings 1 and 2 respectively and said mounts each contain the objective lens system 7 as described above.

Because these objective mounts are of the full size of the open end of the casings 1 and 2, they allow the insertion through said open ends of the casings 1 and 2 of the prism plate assembly consisting of the prism plate or support 8 with the prisms 9 and 10 assembled thereon, without tipping of the prisms, etc. This also allows the prism plate or support 8 to be made of such size as to fill the entire area of the interior of the casing 1 and act as a light trap allowing only light passing through the prisms 9 and 10 to be seen through the eyepiece.

Also as the ends of the casings 1 and 2 are entirely open, they allow easy machining for the lugs etc. 23 on the interior thereof for securing said objective mounts 5 on said casings 1 and 2. These lugs 23 are formed integral with the walls of the casings 1 and 2 and while three of these lugs are shown, it is obvious that any desired number thereof may be used.

The prism plate or support 8 is provided with the recesses 24 adapted to fit over said lugs 23 and the prism plate is adapted to be held on the shelf or the like 25 formed integral with the inner wall of the casing 1 and which has the integral projecting portions 26 having threaded openings therein into which are adapted to extend the screws or the like 27 which engage the threaded openings on said integral projecting portions 26 to retain said prism plate or support 8 thereon in assembled position. While three of said integral projecting portions 26 have been shown, it is pointed out that any desired number may be employed.

The integral lugs 23 extend from adjacent said shelf 25 to adjacent the outer edge of the casings 1 and 2 and have threaded openings therein into which are adapted to extend the screws or the like 28 for retaining the objective mounts 5 in assembled position over the open end of the said casings 1 and 2.

The outer ends of the casings 1 and 2 surrounding the open end thereof and the inner ends of the objective mount 5 are each provided with communicating grooves or recesses 29 adapted to be filled with sealing wax, etc. of the usual type. This allows the filling of the interior of the casing 1 with nitrogen or other gas through the opening 30 and then the screw 31 is screwed into place to prevent leakage of said gas and the wax in the grooves 29 seals the joint between the objective mount and outer end of the casings to prevent leakage of the gas through this joint and the eyepiece is sealed by the wax or the like 18.

The objective mount 5 has the sealed cover 32 adapted to retain the serrated ring 33 in place and the ring 34 is provided for holding the objective lens system 7 and the eccentric ring 35 is provided for adjustment of said objective lens system in its mount.

It is pointed out that by employing the construction shown herein, that in order to change the power of the binocular it is merely necessary to change the objective mounts and provide objective mounts having objective lenses of the power necessary to change the power of the binoculars. This allows using the same casing and eyepiece assembly for various power binoculars within reasonable limits.

It is also pointed out that the outer surface of the casings 1 and 2 are preferably serrated surfaces die cast therein in the surface of said casings in the forming of said casings 1 and 2 and then the said serrated surfaces may be sprayed with a rubber cement having a low thermo conductivity. This eliminates the usual difficult and expensive covering of the surfaces. Also instead of using the rubber cement a black plastic coating such as cellulose acetate may be employed.

From the foregoing it will be seen that I have provided simple, efficient and economical means for obtaining all of the objects and advantages of the invention.

Having described my invention, I claim:

1. In a device of the character described, a casing, an eyepiece at one end of said casing, a support in said casing adapted to support optical elements in optical alignment with said eyepiece, a cover for the end of said casing opposite said eyepiece adapted to extend over substantially the entire end thereof and having a portion adjacent its periphery in engagement with the end of said casing, which cover is adapted to be removed from the casing to allow insertion or removal of the support for optical elements, said cover being adapted to support an optical element in optical alignment with one of the optical elements on said support and a groove between the end of said casing and the portion of said cover in engagement therewith, said groove being adapted to contain a sealing medium to seal the connection between the parts.

2. In a device of the character described, a casing having an eyepiece adjacent one end thereof and an objective adjacent the opposite end, a support in said casing adapted to support optical elements in optical alignment with said eyepiece and said objective, said support being of substantially the same contour as the interior of said casing to prevent the passage of light through said casing except through said optical elements, integral projections on the inner surface of said casing and openings in the periphery of said support adapted to receive said projections, and means for securing said support in said casing.

3. In a device of the character described, a casing having openings in the opposite ends thereof, an eyepiece secured to said casing in line with one of said openings, an objective support secured to said casing in line with the other of said openings, a support in said casing adapted to support optical elements in optical alignment with said eyepiece and objective, integral projecting portions on said casing on which said support is adapted to be secured, and integral projection portions in said casing and extending from adjacent said first named projecting portions to adjacent the end of said casing adjacent said objective, and means for securing said objective support to said projections.

4. In a device of the character described, a casing having openings adjacent opposite ends thereof, an objective mount adapted to overlie one of said openings and support an objective in alignment therewith, an eyepiece adapted to overlie the other of said openings, optical means in said casing in optical alignment with said eyepiece and said objective, scale means in said casing adjacent said eyepiece, and means for supporting said scale in the focal plane of said eyepiece, said means comprising a threaded ring adapted to support said scale and adapted to be adjusted to place said scale in the focal plane of said eyepiece, and a second threaded ring adapted to lock said first threaded ring in said adjusted position.

5. In a device of the character described, a casing having openings adjacent the opposite ends thereof, an eyepiece in one of said openings, an objective mount adapted to overlie the other of said openings and support an objective in alignment therewith, optical means in said casing in optical alignment with said eyepiece and said objective, a support for said optical means, said support being of substantially the same cross section as the opening in said casing, means for securing said optical means in position on said support, integral marginal projections in said casing, and means for supporting said optical element support on said marginal projections.

6. In a device of the character described, a casing having openings adjacent the opposite ends thereof, an objective mount adapted to overlie one of said openings and support an objective in alignment therewith, an eyepiece adapted to overlie the other of said openings, optical means in said casing in optical alignment with said eyepiece and said objective, scale means in said casing adjacent and separate from said eyepiece, means for supporting said scale in the focal plane of said eyepiece, said means comprising a threaded support and a threaded ring adapted to engage said support to support said scale and allow said scale to be adjusted to place said scale in the focal plane of said eyepiece, and a second threaded ring adapted to lock said first threaded ring in said adjusted position.

7. In a device of the character described, a casing having openings adjacent the opposite ends thereof, an objective mount adapted to overlie one of said openings and support an objective in alignment therewith, an eyepiece adapted to overlie the other of said openings, optical means in said casing in optical alignment with said eyepiece and said objective, scale means in said casing adjacent said eyepiece, means for supporting said scale in the focal plane of said eyepiece, said scale supporting means being in alignment with said eyepiece opening and comprising a support and a ring adapted to engage said support to support said scale and allow said scale to be adjusted to place said scale in the focal plane of said eyepiece, and a second ring adapted to lock said first ring in said adjusted position.

8. In a device of the character described, a casing having openings adjacent the opposite ends thereof, an objective mount adapted to overlie one of said openings and support an objective in alignment therewith, an eyepiece adapted to overlie the other of said openings, optical means in said casing in optical alignment with said eyepiece and said objective, scale means in said casing adjacent said eyepiece, an integral projecting portion adjacent said eyepiece opening and having a threaded portion for supporting said scale in the focal plane of said eyepiece, a threaded ring adapted to engage said threaded portion of said integral projecting portion to support said scale and allow said scale to be adjusted to place said scale in the focal plane of said eyepiece, and a second threaded ring adapted to lock said first threaded ring in said adjusted position.

9. In a device of the character described, a casing having openings adjacent the opposite ends thereof, an objective mount adapted to overlie one of said openings and support an objective in alignment therewith, an eyepiece adapted to overlie the other of said openings, optical means in said casing in optical alignment with said eyepiece and said objective, an overhanging flange on said eyepiece adjacent the connection between said eyepiece and said casing and adapted to engage said casing when said eyepiece is secured thereto, and a groove between said flange and said casing adapted to contain a sealing medium to seal the connection between the parts.

10. In a device of the character described, a casing having openings adjacent the opposite ends thereof, an objective mount overlying one of said openings and supporting an objective in alignment therewith, an eyepiece having a cylindrical housing threaded in the other of said openings, and optical means in said casing in optical alignment with said eyepiece and said objective, said housing having an annular shoulder adjacent the connection between said eyepiece and said casing for contacting the casing about said eyepiece opening with a groove in the contact between said casing and the shoulder portion of the eyepiece adapted to contain a sealing medium for sealing the connection between said casing and eyepiece.

11. In a device of the character described, a casing, said casing having openings adjacent the opposite ends thereof, a pair of members supported by said casing with one of said members in alignment with each of said openings and with one of said members supporting an eyepiece tube containing optical elements and the other an objective respectively, a support in said casing adapted to support optical elements in optical alignment with the optical elements carried by said members, one of said members closing its respective opening by engaging the casing both in overlapping and in abutting relation with a groove in the contact between the casing and member, and a sealing medium in the groove to seal the connection between the parts.

12. In a device of the character described, a casing having openings adjacent opposite ends thereof, an objective mount adapted to overlie one of said openings and support an objective in alignment therewith, an eyepiece member adapted to overlie the other of said openings, optical means in said casing in optical alignment with optical means carried by said eyepiece and said objective, a reticule and means for movably supporting said reticule in alignment with said eyepiece comprising a ring supported for adjusting movement axially of the eyepiece relative to said casing and a second ring threadedly engaging the first ring to act as a stop for determining the adjusted position of the reticule.

13. In a device of the character described, a casing having openings adjacent the opposite ends thereof, an objective mount adapted to overlie one of said openings and support an objective in alignment therewith, an eyepiece member adapted to overlie the other of said openings, optical means in said casing in optical alignment with the optical systems of said eyepiece and said objective, a reticule and means on the casing for supporting said reticule for axial movement in alignment with the optical system of said eyepiece, said means comprising a threaded annular portion integral with the casing, an annular carrier for the reticule threaded in said threated portion of the casing for axial adjustment of the reticule, and a threaded stop on the annular carrier for locking the carrier in said adjusted position.

WILLIAM F. PECK.